United States Patent
Nitta et al.

Patent Number: 5,928,580
Date of Patent: Jul. 27, 1999

[54] METHOD OF CONTROLLING A THICKNESS OF A FILM

[75] Inventors: Satoru Nitta; Takayoshi Sano; Koji Mizunuma, all of Shizuoka-Ken, Japan

[73] Assignee: Toshiba Machine Co., Ltd., Tokyo, Japan

[21] Appl. No.: 08/764,580

[22] Filed: Dec. 13, 1996

[30] Foreign Application Priority Data

Dec. 15, 1995 [JP] Japan ................................... 7-327063

[51] Int. Cl.⁶ ............................. B29C 11/10; B29C 47/30
[52] U.S. Cl. ...................... 264/40.4; 264/40.1; 264/40.5; 264/40.7
[58] Field of Search ............................... 264/40.1, 290.1, 264/290.2, 210, 40.5, 40.9, 40.7, 40.4; 425/141

[56] References Cited

U.S. PATENT DOCUMENTS

| 4,409,160 | 10/1983 | Kogo et al. .......................... 264/40.1 |
| 4,931,982 | 6/1990 | Hayashida et al. ..................... 364/473 |

*Primary Examiner*—Ponnathapura Achutamurthy
*Assistant Examiner*—Joseph W. Ricigliano
*Attorney, Agent, or Firm*—Whitham, Curtis & Whitham

[57] ABSTRACT

The present invention provides a method of control in thickness of the biaxially oriented film of a plastic material to be extruded via an extrusion port gap adjustable by adjustment of a plurality of die bolts provided on an automatic T-die. A position corresponding to the die bolt is set on the film biaxially oriented so that a thickness of the film at the above position is measured to find a deviation of the measured thickness from a reference thickness predetermined to thereby carry out a feed-back control of the adjustment of the die bolt in accordance with the deviation. It is important for the present invention that the feed-back control in the adjustment of the die bolt is carried out with reference to partial side-drawing rates different in a width direction of a sheet to be drawn prior to formation of the film, where the partial sidedrawing rates are determined for parts aligned in the width direction of the film. The determination of the partial side-drawing rates are made together with setting a corresponding position on the sheet to the die bolt.

17 Claims, 7 Drawing Sheets

FIG. 8

| No | Ts | Tf | Ws(i) | Ws(i) * | Ws(i) | Ws(i) |
|---|---|---|---|---|---|---|
| 1 | 340 | 86 | 8 | 28.0 | 7.9 | 0.99 |
| 2 | 320 | 45 | 13 | 45.5 | 23.1 | 1.78 |
| 3 | 274 | 20 | 16 | 56.0 | 54.8 | 3.43 |
| 4 | 280 | 20 | 17 | 59.5 | 59.5 | 3.50 |
| 5 | 282 | 20 | 18 | 63.0 | 63.5 | 3.53 |
| 6 | 283 | 20 | 19 | 66.5 | 67.2 | 3.54 |
| 7 | 282 | 20 | 19 | 66.5 | 67.0 | 3.53 |
| 8 | 283 | 20 | 20 | 70.0 | 70.8 | 3.54 |
| 9 | 283 | 20 | 20 | 70.0 | 70.8 | 3.54 |
| 10 | 284 | 20 | 20 | 70.0 | 71.0 | 3.54 |
| 11 | 284 | 20 | 20 | 70.0 | 71.0 | 3.55 |
| 12 | 290 | 20 | 20 | 70.0 | 71.0 | 3.55 |
| 13 | 292 | 20 | 20 | 70.0 | 72.5 | 3.63 |
| 14 | 295 | 20 | 20 | 70.0 | 73.0 | 3.65 |
| 15 | 300 | 20 | 20 | 70.0 | 73.8 | 3.69 |
| 16 | 298 | 20 | 20 | 70.0 | 75.0 | 3.75 |
| 17 | 290 | 20 | 20 | 70.0 | 74.5 | 3.73 |
| 18 | 290 | 20 | 20 | 70.0 | 72.5 | 3.63 |
| 19 | 289 | 20 | 20 | 70.0 | 72.5 | 3.63 |
| 20 | 292 | 20 | 20 | 70.0 | 72.3 | 3.61 |
| 21 | 294 | 20 | 20 | 70.0 | 73.0 | 3.65 |
| 22 | 298 | 20 | 20 | 70.0 | 73.5 | 3.68 |
| 23 | 300 | 20 | 20 | 70.0 | 74.5 | 3.73 |
| 24 | 298 | 20 | 20 | 70.0 | 75.0 | 3.75 |
| 25 | 291 | 20 | 20 | 70.0 | 74.5 | 3.73 |
| 26 | 280 | 20 | 20 | 70.0 | 72.8 | 3.64 |
| 27 | 278 | 20 | 20 | 70.0 | 70.0 | 3.50 |
| 28 | 276 | 20 | 20 | 70.0 | 69.5 | 3.48 |
| 29 | 275 | 20 | 20 | 70.0 | 69.0 | 3.45 |
| 30 | 270 | 20 | 20 | 70.0 | 68.8 | 3.44 |
| 31 | 268 | 20 | 20 | 70.0 | 67.5 | 3.38 |
| 32 | 267 | 20 | 20 | 70.0 | 67.0 | 3.35 |
| 33 | 270 | 20 | 20 | 70.0 | 66.8 | 3.34 |
| 34 | 278 | 20 | 20 | 70.0 | 67.5 | 3.38 |
| 35 | 279 | 20 | 20 | 70.0 | 69.5 | 3.48 |
| 36 | 282 | 20 | 20 | 70.0 | 69.8 | 3.49 |
| 37 | 292 | 20 | 20 | 70.0 | 70.5 | 3.53 |
| 38 | 295 | 20 | 20 | 70.0 | 73.0 | 3.65 |
| 39 | 292 | 20 | 19 | 66.5 | 70.0 | 3.69 |
| 40 | 280 | 20 | 19 | 66.5 | 69.4 | 3.65 |
| 41 | 278 | 20 | 18 | 63.0 | 63.0 | 3.50 |
| 42 | 277 | 20 | 17 | 59.5 | 59.1 | 3.48 |
| 43 | 320 | 20 | 16 | 56.0 | 55.4 | 3.46 |
| 44 | 320 | 50 | 13 | 45.5 | 20.8 | 1.60 |
| 45 | 360 | 90 | 8 | 28.0 | 8.0 | 1.00 |

* A Width Corresponding to a Bolt Pitch in a Constant Side-Drawing Rate

METHOD OF CONTROLLING A THICKNESS OF A FILM

BACKGROUND OF THE INVENTION

The present invention relates to a method of controlling a thickness of a biaxially oriented film in an automatic T-die, and more particularly to a method of controlling and observing a thickness of a biaxially oriented film by accurate setting of corresponding positions on the film to bolts of the T-die.

In prior art, the control in the thickness of the biaxially oriented film was generally carried out as follows. A sheet of a plastic material is extruded from an automatic T-die having a plurality of die bolts for adjustment of a gap of an extrusion port of the automatic T-die. The extruded plastic material sheet is cooled to be solidified in a cast roll unit. The solidified sheet is then stretched or drawn through a sequential biaxial drawing machine which comprises a vertical drawing and a horizontal drawing with a hot air blower to form a film product at the time when the thickness of the film is measured to control the T-die.

The distribution of the thickness of the film product in a direction of the film width is measured by use of a scanning thickness gauge. The measured thickness of the film is compared to a reference thickness previously determined to find deviations in the thickness of the film versus the reference value so as to find a position where the deviation in the thickness of the film is over a predetemined value whereby adjustment of the bolt located at the above position is carried out with reference to the found deviations of the thickness.

It is possible to continuously form the film product having a uniform thickness in the direction of the film width by use of the above method.

The above method of controlling the thickness of the biaxially oriented film has the following disadvantages.

According to the above conventional method of controlling the thickness of the biaxially oriented film, the deviation of the measured thickness of the film from the predetermined reference thickness is found so that the adjustment of the bolt located at the position corresponding, in the film width direction, to the position where the found deviation is over the predetermined value is placed under the feedback control. Actually, however, it was difficult to accurately set the die bolt at the position corresponding to the position on the film. Namely, it is difficult to determine the corresponding position on the film to the position where the die bolt is located. This makes it difficult to actually carry out the required accurate control and observation of the thickness of the film.

The above difficulty in determining the corresponding position on the film to the position where the die bolt is located is caused by the fact that the position corresponding to the position of the bolt is set by regarding the side drawing rate as constant even though the side drawing rate is actually varied in the direction of the film width. Such variation of the side drawing rate in the direction of the film width causes not only the variation in thickness of the film product but also variation in tensile strength of the film product, resulting in deterioration in quality of the film product.

SUMMARY OF THE INVENTION

Accordingly, it is an object of the present invention to provide a method of control in thickness of a biaxially oriented film free from the above disadvantages and problems.

It is a further object of the present invention to provide a method of control in thickness of a biaxially oriented film by an accurate setting of a corresponding position on the film to the bolt to improve accuracy of control in the thickness of the film.

It is a further object of the present invention to provide a method of control in thickness of a biaxially oriented film by an accurate setting of a corresponding position on the film to the bolt to facilitate observation and adjustment of the side drawing rate of the film.

The above and other objects, features and advantages of the present invention will be apparent from the following descriptions.

The present invention provides a method of control in thickness of the biaxially oriented film of a plastic material to be extruded via an extrusion port gap adjustable by adjustment of a plurality of die bolts provided on an automatic T-die. A position corresponding to the die bolt is set on the film biaxially oriented so that a thickness of the film at the above position is measured to find a deviation of the measured thickness from a reference thickness predetermined to thereby carry out a feed-back control of the adjustment of the die bolt in accordance with the deviation. It is important for the present invention that the feed-back control in the adjustment of the die bolt is carried out with reference to partial side-drawing rates different in a width direction of a sheet to be drawn prior to formation of the film, where the partial side-drawing rates are determined for parts aligned in the width direction of the film. The determination of the partial side-drawing rates are made together with setting a corresponding position on the sheet to the die bolt.

Each of the partial side-drawing rates may be determined by comparing a mass of the plastic material of the film in a width corresponding to a pitch between two adjacent die bolts aligned on the film from a reference bolt to a mass of the plastic material of the sheet in a width corresponding to a pitch between adjacent two of die bolts aligned on the sheet from a reference bolt. The corresponding position on the film to the die bolt is determined by adding a reference position of the reference die bolt with the pitch of the die bolts aligned on the film from the reference bolt.

The reference positions of the reference die bolts may be set at the end or the center of the film is and the sheet.

The partial side-drawing rates of the film are drawn on the graph so that if any one of the partial side-drawing rates are of the film beyond a predetermined allowable range, then an alarm is raised. If the variations among the partial side-drawing rates beyond a predetermined allowable range, then he hot air to be blown onto the film is controlled in temperature, capacity and speed independently for every parts aligned in the width direction of the film.

As described above, in accordance with the present invention, the feed-back control in the adjustment of the die bolt is carried out with pg,3 reference to partial side-drawing rates varied in a width direction of a sheet to be drawn prior to formation of the film without, however, reference to a fixed side-drawing rate contrary to the prior art. According to the present invention, the partial side-drawing rates are continuously referred to improve the accuracy of setting the position of the die bolts and to facilitate the observation and the adjustment of the thickness of the film product.

BRIEF DESCRIPTIONS OF THE DRAWINGS

Preferred embodiments according to the present invention will be described with reference to the accompanying drawings.

FIG. 8 is a table showing various data involved in a system for controlling a thickness of a biaxially oriented film in accordance with the present invention.

EMBODIMENTS

A first embodiment according to the present invention will be described with reference to the drawings, wherein there is provided a method of control in thickness of a biaxially oriented film by an accurate setting of a corresponding position on the film to the bolt to improve accuracy of control in the thickness of the film and facilitate observation and adjustment of the side drawing rate of the film.

Figure 1:
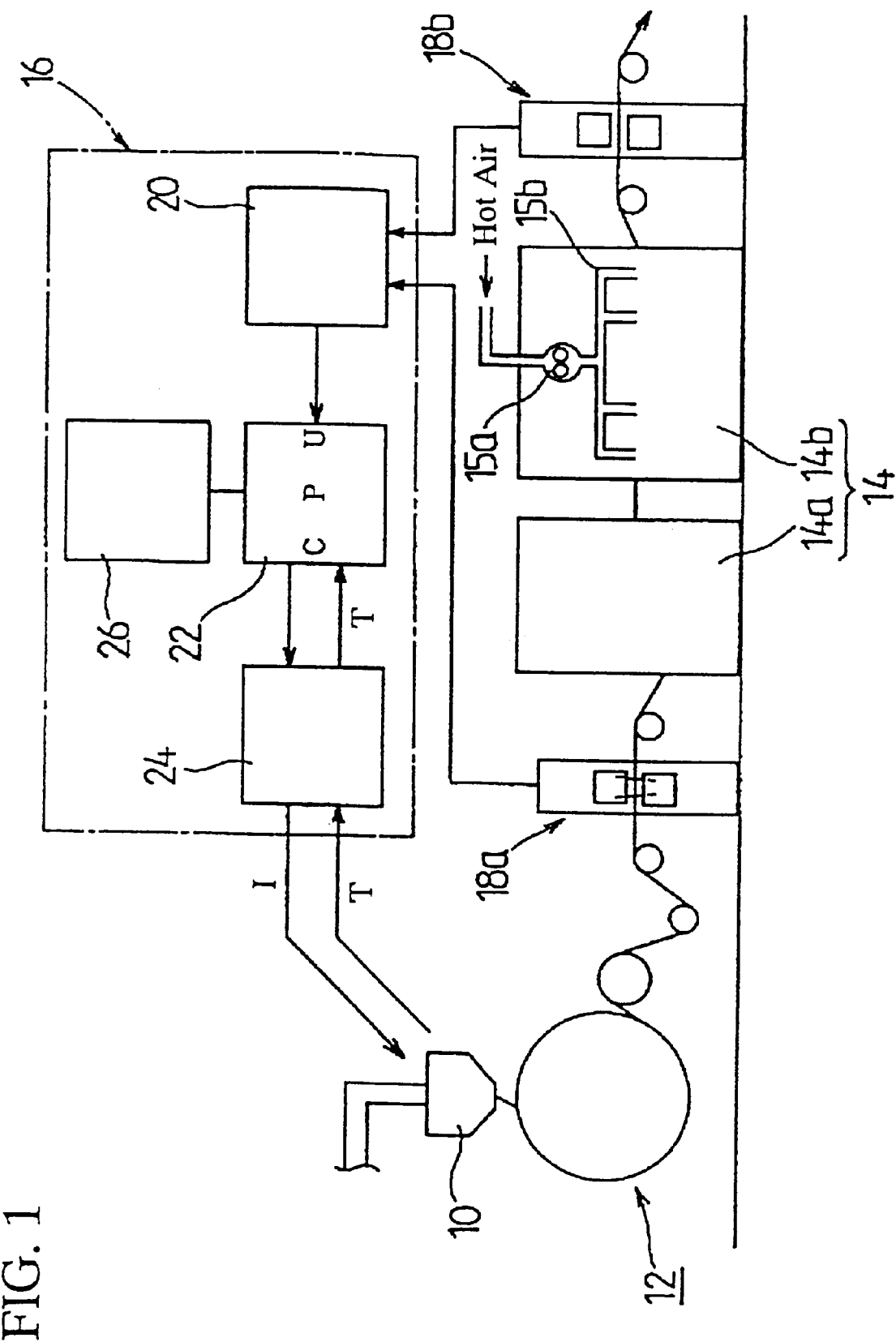
FIG. 1 is a block diagram illustrative of a system for controlling a thickness of a biaxially oriented film in accordance with the present invention.

FIG. 1 is a diagram illustrative of a sequential biaxial-drawing machine wherein vertical and side drawings of the film are carried out in different processes for forming a biaxially oriented film with a controlled thickness. A sheet of a plastic material as an original is extruded from an extrusion port of an automatic T-die 10 having a plurality of die bolts not illustrated and being capable of adjusting a gap of the extrusion port. The extruded sheet is cooled to be solidified by a cast roll unit 12. The solidified sheet is then transferred to a first scanning thickness gauge 18a for measuring the thickness of the sheet before entering into the drawing process. The sheet is subsequently fed into a vertical drawing machine 14a where the sheet is drawn in the vertical direction or the longitudinal direction before the sheet is further fed into a side drawing machine 14b where the sheet is further drawn in the side direction to thereby form a film product biaxially oriented or drawn by the vertical and side drawing machines 14a and 14b. The film biaxially oriented is then fed to a second scanning thickness gauge 18b for measuring the thickness of the film at positions corresponding to the die bolts. The positions corresponding to the die bolts are set on the film so that the thickness of the film at the positions having been set to find the deviation of the thickness from the reference thickness predetermined before a feed-back control in the adjustment of the die bolt is carried out by an automatic T-die controller system 16 with reference to the deviation found.

In the side drawing machine 14b, a blower 15a and ducts 15b coupled to the blower 15a are provided for blowing a hot air to the sheet drawn in the vertical or longitudinal direction. The blower 15a is controlled by a hot air blower controller not illustrated.

The above automatic T-die controller 16 has a central processing unit 22, an automatic T-die controller 24, a thickness gauge controller 20, and a display 26. The thickness gauge controller 20 is coupled to the first and second thickness gauges 18a and 18b for fetching the measured thicknesses of the sheet and film at the positions corresponding to the die bolts. The thickness gauge controller 20 is also coupled to the central processing unit 22 for supplying the fetched information about the measured thicknesses of the sheet and film to the central processing unit 22. The central processing unit 22 computes partial side-drawing rates of parts aligned in a side direction of the film and also set positions corresponding to the die bolts on the film. The central processing unit 22 further computes the profile of the measured thickness of the film at the positions corresponding to the die bolts to find the deviation in thickness of the film from the reference thickness so as to designate any die bolt located at a position where the film has a measured thickness deviation which beyond the predetermined allowable limit. As a result, the central processing unit 22 controls the automatic T-die controller to carry out a feed-back control of the adjustment of the designated die bolt so as to set an appropriate lip gap. The date obtained by the central processing unit 22 are also fed to the display device 26 for displaying the data.

Figure 2A:
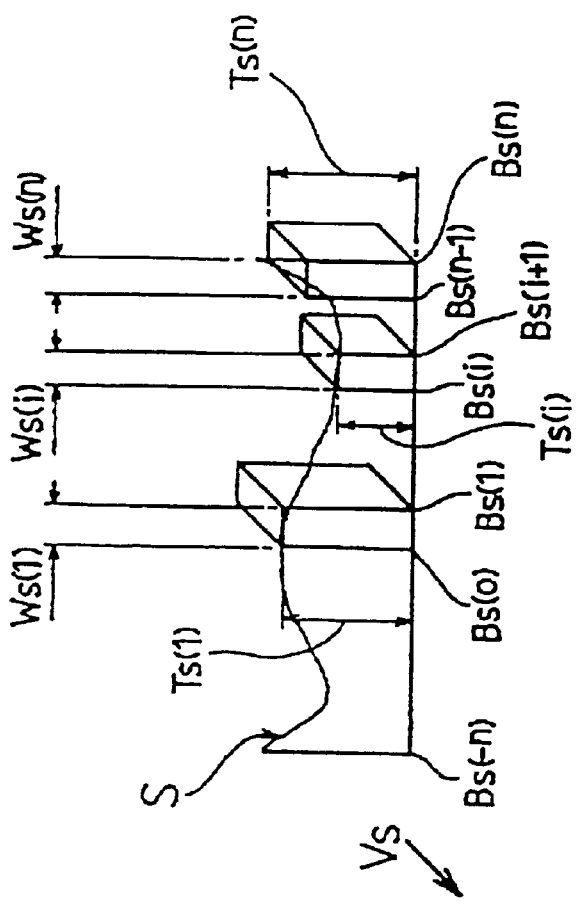
FIG. 2A is a view illustrative of a method of determination of die-bolt corresponding positions on a sheet in accordance with the present invention.
Figure 2B:
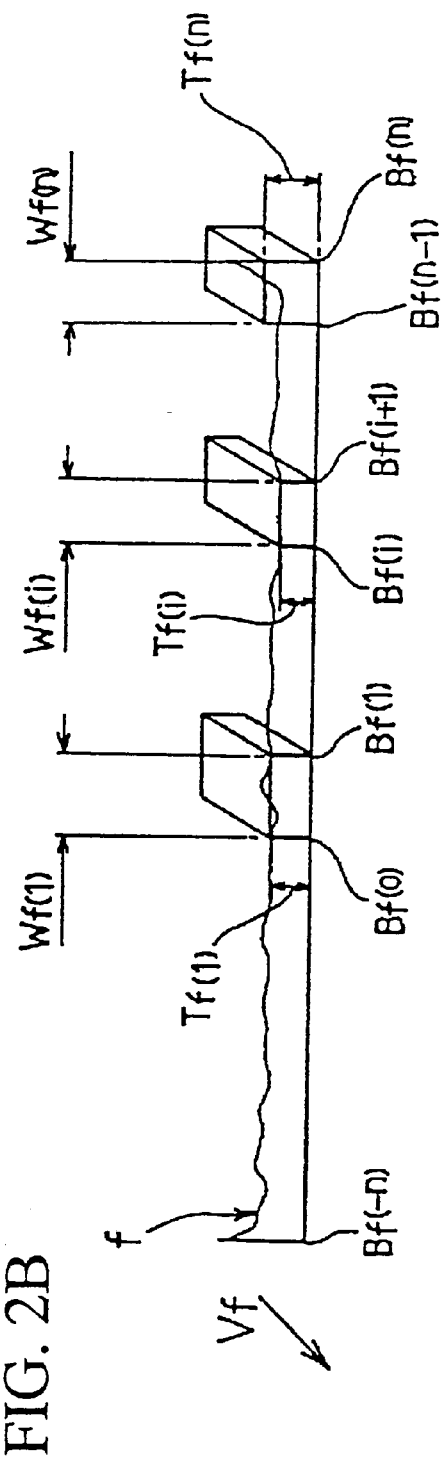
FIG. 2B is a view illustrative of a method of determination of die-bolt corresponding positions on a film in accordance with the present invention.

In accordance with the present invention, as illustrated in FIGS. 2A and 2B, not only the corresponding position Bf(i) to the die bolt is set on the film F having already been drawn but also the corresponding position Bs(i) to the die bolt is set on the sheet S. A partial drawing rate Ff(i) is determined together with the bolt corresponding position Bs(i) on the sheet. The determination of the die bolt corresponding position Bs(i) on the sheet may be made by carrying out a layout in consideration of a neck-in phenomenon of the plastic material in the automatic T-die 10 as disclosed in the Japanese patent publication No. 5-76413.

As illustrated in FIG. 2B, each of the partial side-drawing rates Ff(i) is determined by comparing a mass Mf(i) of the plastic material of the film F in a width corresponding to a pitch Wf(i) between adjacent two of die bolts Bf(i) aligned on the film from a reference die bolt Bf(0) to a mass Ms(i) of the plastic material of the sheet in a width Ws(i) corresponding to a pitch between adjacent two of die bolts Bs(i) aligned on the sheet from a reference bolt Bs(0).

The mass Mf(i) and Ms(i) of the plastic material of the film and sheet in the pitches Wf(i) and Wf(i) remain unchanged, for which reason the following equation is given.

$$Ws(i) \times Ts(i) \times V = Wf(i) \times Tf(i) \times Vf \qquad (1)$$

where Ts(i) and Tf(i) are the average thicknesses of the sheet and film in the pitch widths Ws(i) and Wf(i), and Vs and Vf are the transferring speeds of the sheet and film.

Calculation of the above equation results in the equation of Wf(i)/Ws(i)=Ff(i).

If there is any variation in density of the sheet and film, it is preferable to add a new term for compensation of the variation thereof.

The corresponding positions Bf(i) to the die bolt on the film may be calculated by back calculation when the partial side-drawing rate Ff(i) is calculated.

The above equation may be transformed into the following equation.

$$Wf(i)=Ws(i) \times Ts(i)/Tf(i) \times Vs/Vf \qquad (2)$$

The die bolt pitch Wf(i) is added to the reference die bolt corresponding position Bf(0) according to the following equation.

$$Bf(i)=Wf(1)+Wf(2)+\ldots+Wf(i)+ \qquad (3)$$

If in the above equation (2) the thickness vaules Ts(i) and Tf(i) are changed into the ratio of the measured thicknesses to the averages or TsR and TfR and the entire side-drawing rate ESR is used, the following equation is given.

$$Wf(i)=Ws(i) \times TsR(i) \times TfR\ ESR \qquad (2\text{-}1)$$

In accordance with the present invention, the partial side-drawing rate of the film may continuously be calculated and measured to enable the necessary observation and the adjustment.

Figure 3:
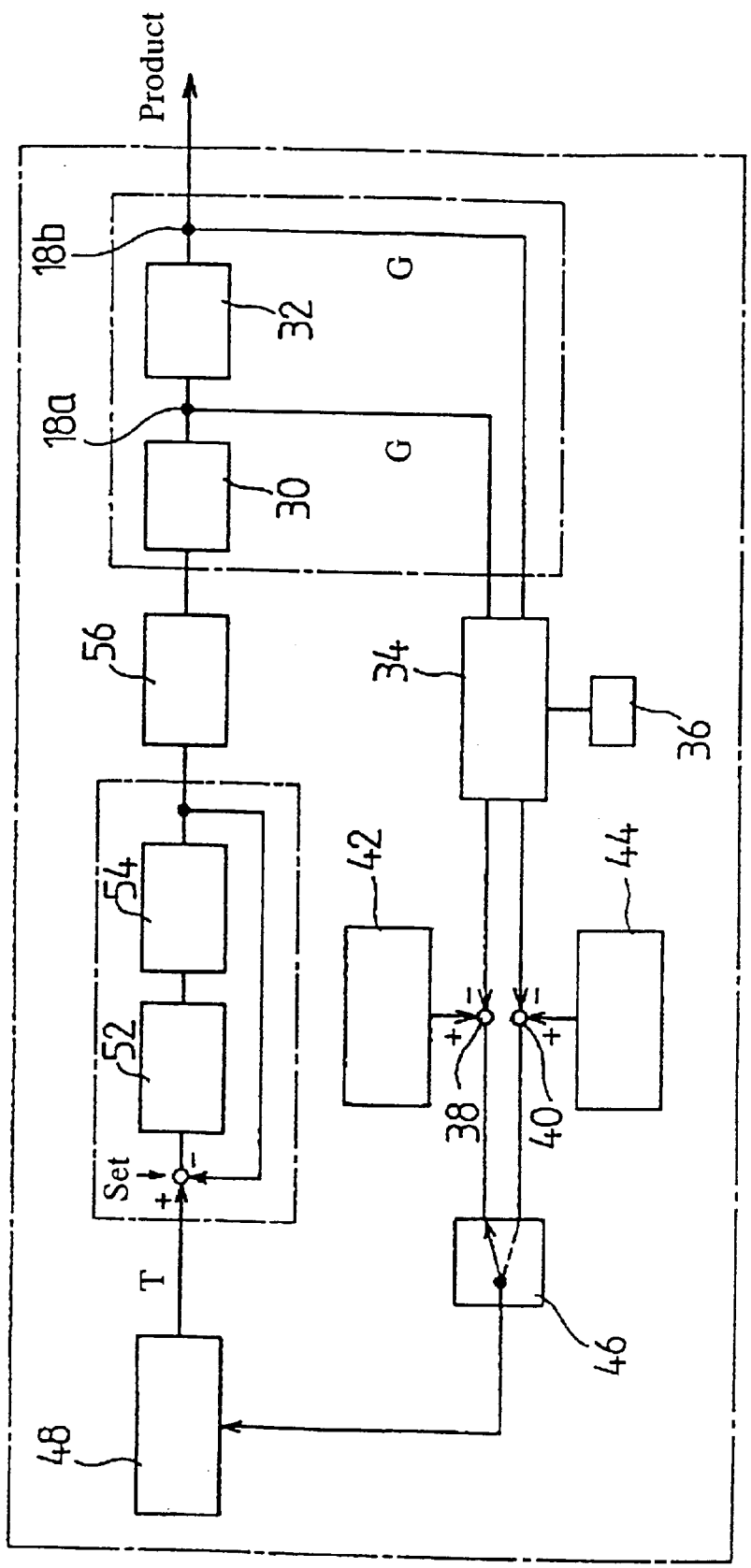
FIG. 3 is a block diagram illustrative of a control circuit provided in a system illustrated in FIG. 1 in accordance with the present invention.

FIG. 3 is a block diagram illustrative of the control circuits for controlling the profile in the width direction. After the sheet is formed in the sheet formation process 30, the thickness of the sheet is measured by the thickness gauge 18a. Thereafter, the film is formed from the sheet in the film formation process 32 and then the thickness of the film is measured by the thickness huge 18b. Data of the thicknesses of the sheet and film are used to calculate the profile data of the sheet and film in the profile processor 34. The profile data are also displayed by the display device 36.

The data about the sheet and film obtained by the profile processor 34 are fed to arithmetic units 38 and 40 where the data are compared with a sheet target profile 42 and a film target profile 44. The results of the comparisons are then fed via a control mode switch 46 to a profile control arithmetic unit 48. In the profile control arithmetic unit 48, the temperature of the automatic T-die is calculated. The calculated temperature of the automatic T-die is compared with a predetermined value so that control signals are supplied via a temperature controller 52 and a heat control power supply 54 to a heater. In this case, a feed-back control of the temperature is carried out. Further the die bolt controller 56 controls adjustment of the die bolt to obtain a proper lip gap.

Figure 4:
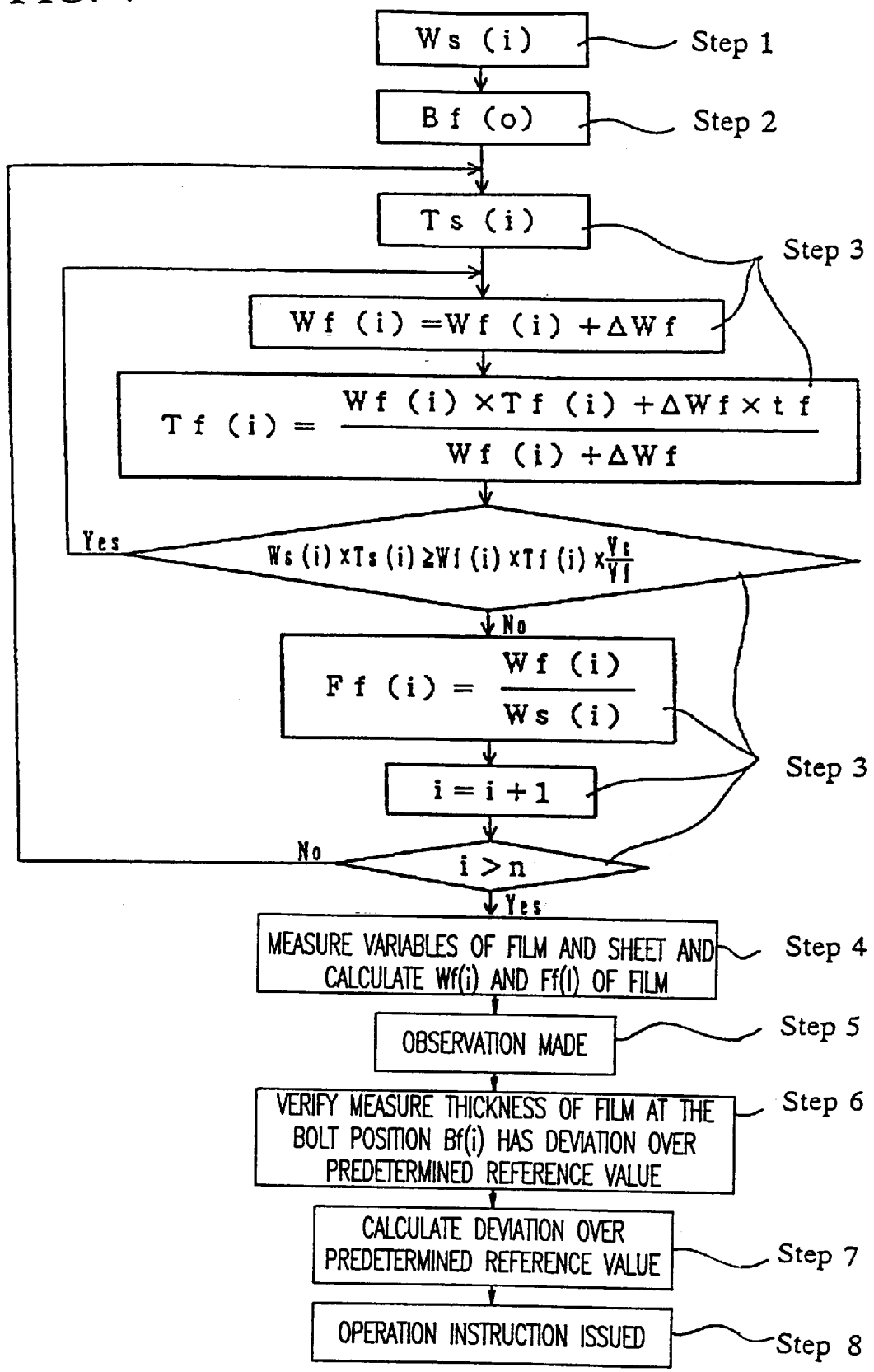
FIG. 4 is a flow chart of arithmetic processes for controlling a thickness of a biaxially oriented film in accordance with the present invention.

Arithmetic processing processes will be described with reference to FIG. 4.

In the step 1, the die bolt corresponding positions Bs(i) on the sheet S and the die bolt pitch corresponding width Ws(i) are allocated in consideration of the neck-in phenomenon of the T-die 10.

In the step 2, a half of the width of the film is substituted in the above equation (2) to set the reference die bolt corresponding positions Bf(0) and Bs(O) at the center position of the film and sheet. Alternatively, it may be possible to set the reference die bolt corresponding positions Bf(0) and Bs(0) at the end position of the film and sheet.

Figure 5A:
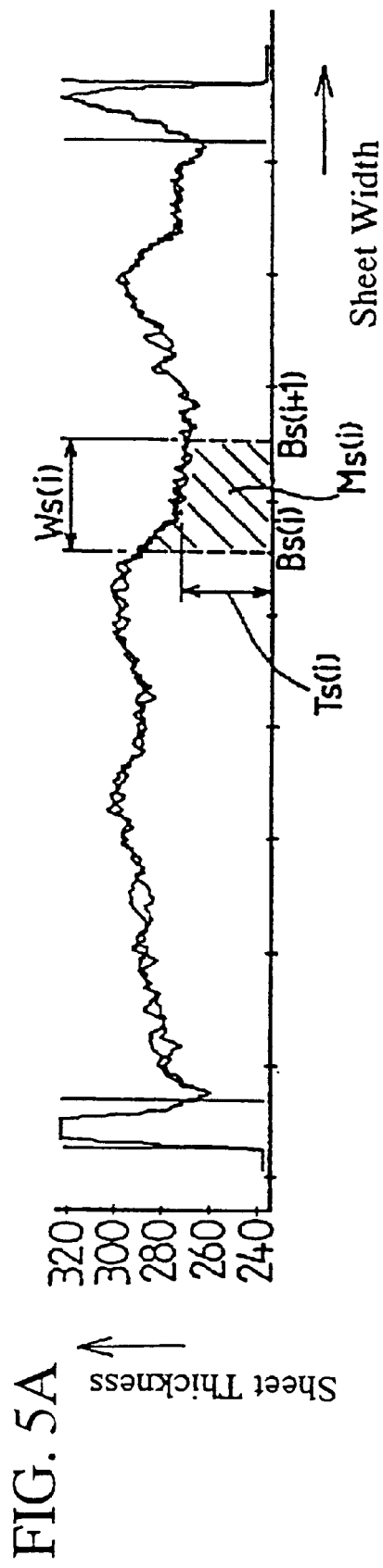
FIG. 5A is a diagram illustrative of a profile in thickness of the sheet in a system for controlling a thickness of a biaxially oriented film in accordance with the present invention.
Figure 5B:
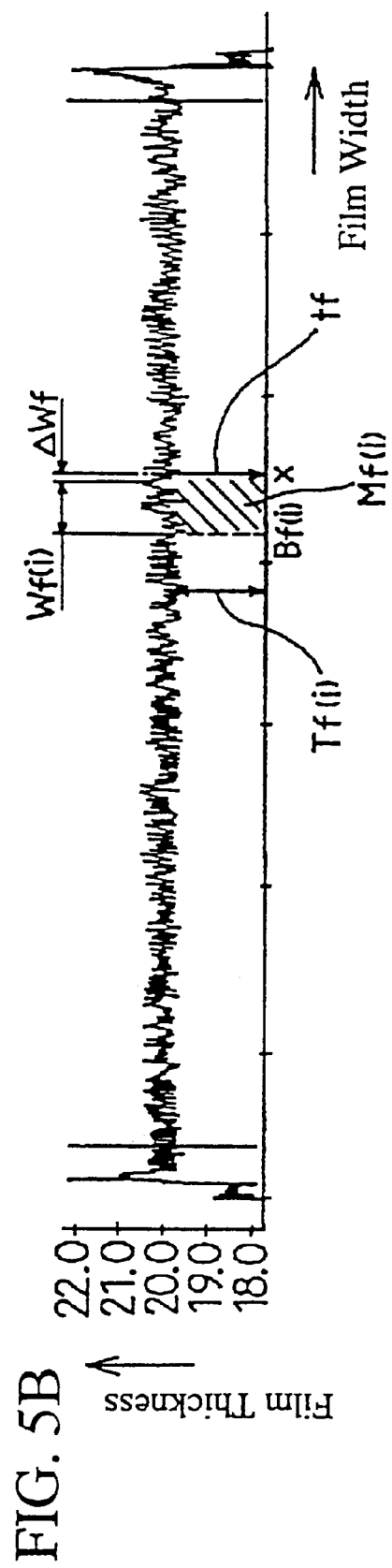
FIG. 5B is a diagram illustrative of a profile in thickness of the film in system for controlling a thickness of a biaxially oriented film in accordance with the present invention.

In the step 3, for the right half parts of the film and sheet, the average thickness Tf(i) and Ts(i) of the film and sheet as well as the transferring speeds Vf and Vs of the film and sheet are measured to calculate the die bolt pitch width Wf(i) and the partial side-drawing rate Ff(i) of the film based upon the measured data. As illustrated in FIGS. 5A and 5B, the film thickness $t_f$ is measured at a measuring point X so that a calculation is made on the basis of the measured film thickness $t_f$ and the measured pitch Δ Wf to verify whether the mass Mf(i) of the plastic material of the film beyond the mass Ms(i) of the plastic material of the sheet. Concurrently, the die bolt corresponding position Bf(i) is also determined.

In the step 4, for the left half parts of the film and sheets the average thickness Tf(i) and Ts(i) of the film and sheet as well as the transferring speeds Vf and Vs of the film and sheet are measured to calculate the die bolt pitch width Wf(i) and the partial side-drawing rate Ff(i) of the film based upon the measured data. As illustrated in FIGS. 5A and 5B, the film thickness $t_f$ is measured at a measuring point X so that a calculation is made on the basis of the measured film thickness $t_f$ and the measured pitch Δ Wf to verify whether the mass Mf(i) of the plastic material of the film beyond the mass(i) of the plastic material of the sheet. Concurrently, the die bolt corresponding position Bf(i) is also determined.

In the step 5, if necessary, an observation by graphic-displaying the partial sidedrawing rate, an issuance of the alarm as well as adjustment of the hot air blow conditions such as temperature, volume and flow speed are made.

In the step 6, it is verified whether the measured thickness of the film at the die-bolt corresponding positions Bf(i) has a deviation over the predetermined reference value. If the deviation beyond the predetermined reference value, then the process enters into the step 7.

In the step 7, the adjustment of the die bolt located at the die-bolt corresponding positions Bf(i) where the film thickness has the deviation over the predetermined reference value is calculated.

In the step 8, the operational instruction is issued.

As described above, in accordance with the present invention, the feed-back control in the adjustment of the die bolt is carried out with reference to partial side-drawing rates varied in a width direction of a sheet to be drawn prior to formation of the film without, however, reference to a fixed side-drawing rate contrary to the prior art. According to the present invention, the partial side-drawing rates are continuously referred to improve the accuracy of setting the position of the die bolts and to facilitate the observation and the adjustment of the thickness of the film product.

Assuming that the automatic T-die 10 has a total width of 900 mm, a die bolt pitch of 20 mm, and 45 of the die bolts, the description of the embodiment will be made as follows.

The sheet has a width of 820 mm and a transferring speed of 50 m/min The film has a width of 2870 mm and a transferring speed of 200 m/min.

Even in FIGS. 5A and 5B the average thicknesses of the sheet and film are 285 micrometers and 20 micrometers respectively, the sheet thickness has a large variation.

Figure 6:
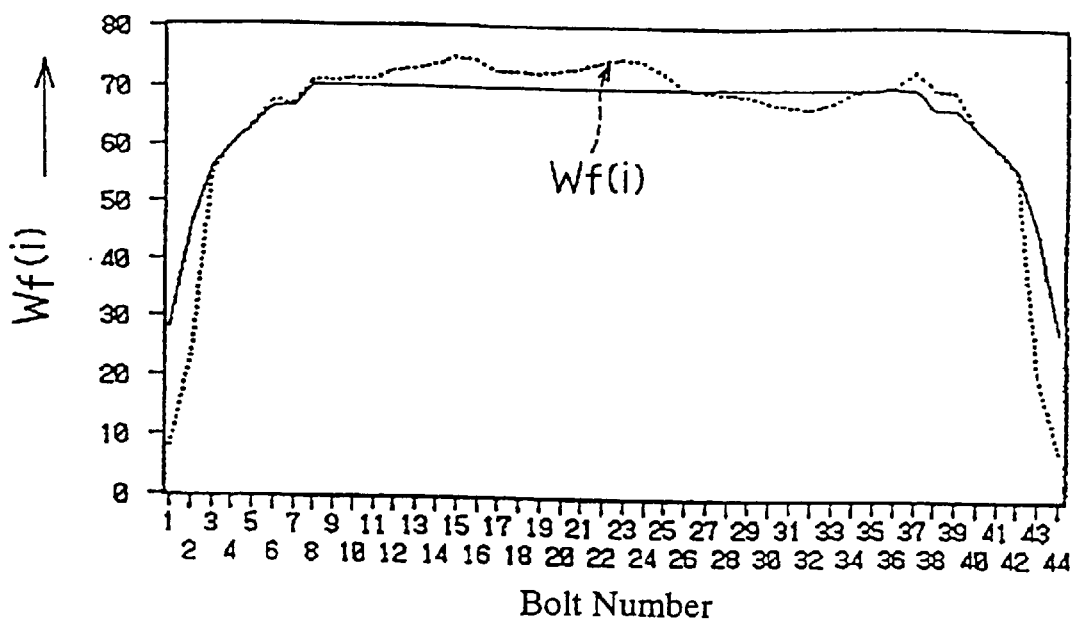
FIG. 6 is a diagram illustrative of a profile in a width corresponding to a pitch between die bolts on a film in a system for controlling a thickness of a biaxially oriented film in accordance with the present invention.
Figure 7:
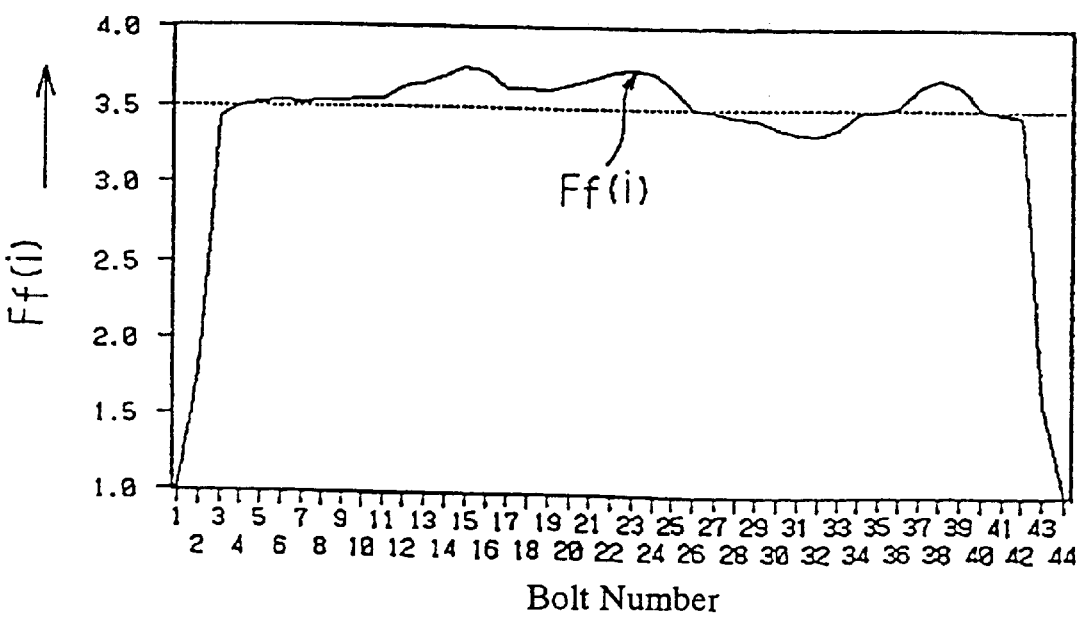
FIG. 7 is a diagram illustrative of a profile in a partial side-drawing rate on a film in a system for controlling a thickness of a biaxially oriented film in accordance with the present invention.

In FIGS. 6 and 7, the die bolt pitch width Wf(i) and the partial side-drawing rate of the film are largely different from those of the prior art. For example, the partial side-drawing rate of the film according to the present invention is 3.34–3.75 times of the constant side-drawing rate of the film in the prior art.

In FIG. 8, those differences in the die bolt pitch width Wf(i) and the partial side-drawing rate of the film are illustrated.

The above embodiment demonstrates that the die bolt pitch corresponding width on the film partially differentiates the side-drawing rate thereof. In this method, referring to the partial side-drawing rate is essential.

Whereas modifications of the present invention will be apparent o a person having ordinary skill in the art, to which the invention pertains, it is to be understood that embodiments as shown and described by way of illustrations are by no means intended to be considered in a limiting sense. Accordingly, it is to be intended to cover by claims any modifications of the present invention which fall within the spirit and scope of the present invention.

What is claimed is:

1. A method of controlling a thickness of a biaxially oriented plastic material film extruded via an extrusion port gap which is adjustable by adjustment of a plurality of die bolts provided on an automatic T-die, wherein a position corresponding to each die bolt is set on the biaxially oriented film so that a thickness of the film at the corresponding position is measured in order to find a deviation of the measured thickness from a predetermined reference thickness so as to carry out a feed-back control of the adjustment of the die bolt in accordance with the deviation, the method comprising:

determining partial side-drawing rates for parts aligned in a width direction of the film, where the partial side-drawing rates are determined by comparing (i) a mass of the plastic material film in a width corresponding to a pitch between adjacent die bolts aligned on the film from a first reference bolt and (ii) a mass of the plastic material of a sheet in a width corresponding to a pitch between adjacent die bolts aligned on the sheet from a second reference bolt;

setting a corresponding position on the sheet to each die bolt together with the determining step; and performing the feed-back control, for adjustment of at least one reference die bolt, executed with reference to the partial side-drawing rates different in the width direction of a sheet prior to formation of the film, thereby controlling the thickness of the film.

2. The method as claimed in claim 1, further comprising determining the corresponding position on the film to the second reference bolt which comprises adding the reference position of the first reference die bolt to the pitch of the die bolts aligned on the film from the first reference bolt to the second reference bolt.

3. The method as claimed in claim 1, further comprising raising an alarm if any one of the partial side-drawing rates of the film exceeds a predetermined allowable range.

4. The method as claimed in claim 1, further comprising setting reference positions of the reference die bolts at the ends of the film and the sheet.

5. The method as claimed in claim 1, further comprising setting reference positions of the reference die bolts at the centers of the film and the sheet.

6. The method as claimed in claim 1, further comprising;
drawing the partial side-drawing rates of the film on a graph and;
raising an alarm if any one of the partial side-drawing rates of the film exceeds a predetermined allowable range.

7. The method as claimed in claim 1, wherein if the variations among the partial side-drawing rates exceed a predetermined allowable range, then the hot air to be blown onto the film is controlled in temperature, volume and speed independently for every part aligned in the width direction of the film.

8. A method of controlling a thickness of a biaxially oriented plastic material film extruded via an extrusion port gap which is adjustable by adjustment of a plurality of die bolts provided on an automatic T-die, the method comprising:

calculating partial side-drawing rates of parts aligned in a side direction of the film and setting positions on the film that correspond to the die bolt, where the partial side-drawing rates are calculated by comparing (i) a mass of the plastic material film in a width corresponding to a pitch between adjacent die bolts aligned on the film from a first reference bolt and (ii) a mass of the plastic material of the sheet in a width corresponding to a pitch between adjacent two die bolts aligned on the sheet from a second reference bolt;

computing a measured thickness of the film corresponding to the die bolts in order to find a deviation of thickness beyond a predetermined allowable thickness;

setting a corresponding position on the sheet to each die bolt together with the calculating step;

calculating profile data of the film thickness and the sheet thickness at the measured position corresponding to each die bolt;

comparing the calculating profile data of the film thickness and the sheet thickness with a film target profile and a sheet target profile, respectively; and controlling an automatic T-die controller to carry out a feed-back control of the adjustment of a designated die bolt so as to set a lip gap, based on the steps of calculating the profile data and comparing the calculating profile data steps, wherein at least one reference die bolt is adjusted in response to the profile data and comparing the calculating profile data steps.

9. The method of claim 8, further comprising:
measuring a thickness of a sheet prior to formation of the film;
measuring a thickness of the film; and
supplying the measured thickness of the film and the sheet to a processing unit.

10. The method of claim 8, wherein measuring the pitch of the die bolts comprises:
measuring an average thickness of a first half of the film and sheet; and
measuring a transfer speed of the film and the sheet.

11. The method of claim 8, wherein measuring the partial side rates comprises:
measuring an average thickness of a first half of the film and sheet; and
measuring a transfer speed of the film and the sheet.

12. The method of claim 8, wherein the partial side rates are continuously calculated and measured in order to adjust the die bolts.

13. The method as claimed in claim 8, further comprising setting reference positions of the designated die bolts at the ends of the film and the sheet.

14. The method as claimed in claim 8, further comprising setting reference positions of the designated die bolts at the centers of the film and the sheet.

15. The method as claimed in claim 8, further comprising:
raising an alarm if the partial side-drawing rates of the film exceeds a predetermined allowable range; and
raising an alarm if the thickness of the film exceeds a predetermined allowable range.

16. The method as claimed in claim 1, wherein when the mass of the plastic material of the film corresponding to any selected pitch exceeds the mass of the plastic material of the sheet corresponding to said selected pitch, the partial side drawing rate in the width direction corresponding to the pitch of individual die bolts is continuously measured or computed.

17. The method of claim 1, wherein the feed-back control includes (i) calculating profile data of the film thickness and the sheet thickness at the measured position corresponding to each die bolt and (ii) comparing the calculating profile data of the film thickness and the sheet thickness with a film target profile and a sheet target profile, respectively, wherein at least one reference die bolt is adjusted in response to the calculating and comparing steps.

* * * * *